United States Patent [19]

Kato et al.

[11] Patent Number: 4,828,937
[45] Date of Patent: May 9, 1989

[54] PROCESS FOR PRODUCING HOLLOW EXTRUDATE FOR USE IN VACUUM

[75] Inventors: Yutaka Kato; Kenji Tsukamoto; Eizo Isoyama, all of Sakai, Japan

[73] Assignee: Showa Aluminum Corporation, Osaka, Japan

[21] Appl. No.: 8,236

[22] Filed: Jan. 29, 1987

[30] Foreign Application Priority Data

Jan. 31, 1986 [JP] Japan ............................ 61-20895

[51] Int. Cl.$^4$ .................. B32B 15/20; F16L 9/02
[52] U.S. Cl. ..................................... 428/654; 138/143
[58] Field of Search .................. 72/38, 253.1, 269; 138/143, 140, 142; 428/654, 577, 586

[56] References Cited

U.S. PATENT DOCUMENTS

| | | | |
|---|---|---|---|
| 2,726,436 | 12/1955 | Champion | 428/654 |
| 3,436,804 | 4/1969 | Broverman | 428/654 |
| 3,809,155 | 5/1974 | Anthony et al. | 138/143 |
| 3,827,864 | 8/1974 | Kanai et al. | 428/654 |
| 3,859,058 | 1/1975 | Anthony | 138/143 |
| 3,941,570 | 3/1976 | Couchman | 428/654 |
| 4,165,627 | 8/1979 | Boshold | 72/265 |
| 4,172,923 | 10/1979 | Kawase et al. | 138/143 |
| 4,316,373 | 2/1982 | Zilges et al. | 72/38 |
| 4,578,973 | 4/1986 | Ishimaru et al. | 72/253.1 |
| 4,632,885 | 12/1986 | Tanabe et al. | 428/654 |

FOREIGN PATENT DOCUMENTS

| | | | |
|---|---|---|---|
| 67632 | 12/1982 | European Pat. Off. | 428/654 |
| 44742 | 4/1981 | Japan | 428/654 |
| 25380 | of 1879 | United Kingdom | 428/654 |

Primary Examiner—John J. Zimmerman
Attorney, Agent, or Firm—Armstrong, Nikaido, Marmelstein, Kubovcik & Murray

[57] ABSTRACT

A hollow extrudate for use in a vacuum is produced by a process comprising the steps of hermetically closing the forward open end of a hollow shaped material immediately after extrusion from a billet, cutting the shaped material after a predetermined length thereof has been subsequently extruded and hermetically closing the cut end at the same time, and cutting off the closed ends. The billet is a composite material composed of a core of aluminum having a high purity of at least 99.9% and an aluminum alloy cladding. The extrudate obtained has an inner layer and an outer layer corresponding to the core and the cladding, respectively.

5 Claims, 2 Drawing Sheets

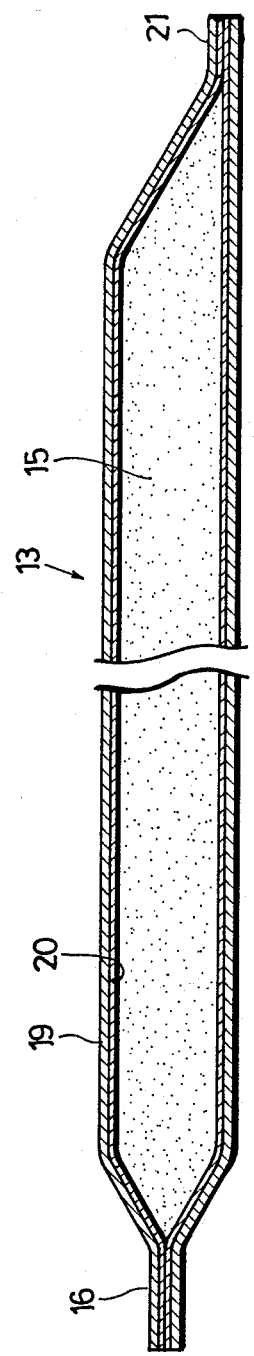
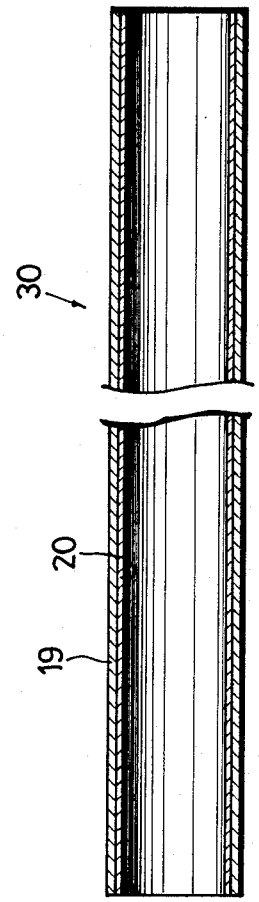

PROCESS FOR PRODUCING HOLLOW EXTRUDATE FOR USE IN VACUUM

BACKGROUND OF THE INVENTION

The present invention relates to a process for producing hollow extrudates for use in a vacuum, and more particularly to a process for producing a hollow extrudate for use in a high vacuum such as a pipe providing a particle accelerating beam chamber.

While stainless steel pipes were used for particle accelerating beam chambers, aluminum alloys have recently been found to be suited to this application and therefore placed into use. Such pipes defining a particle accelerating beam chamber are usually prepared from a billet of AA6063, AA6061 or like Al-Mg-Si alloy by a process comprising the steps of hermetically closing the forward open end of a hollow shaped material immediately after extrusion from the billet, subsequently extruding a predetermined length of shaped material, cutting off the predetermined length of extruded material and hermetically closing the cut end thereof at the same time, and cutting off the opposite closed ends (see U.S. Pat. No. 4,578,973).

With this conventional process, the inner surface of the hollow portion of the shaped material is substantially held out of contact with the atmosphere during extrusion, consequently preventing formation on the inner surface of a hydrous oxide film which is liable to adsorb or occlude vacuum reducing substances and alternatively permitting formation of an oxide film which is compacter and thinner than the hydrous oxide film. The latter oxide film is much less likely to adsorb or occlude vacuum reducing substances, and such substances, even if adsorbed or occluded, are easily removable by an outgassing treatment. Accordingly, the chamber can be maintained at a high degree of vacuum, with greatly reduced quantities only of objectionable substances released into the chamber. This serves to obviate or lessen the cumbersome work that would otherwise be needed to afford a high vacuum.

The billet conventionally used in the above process for preparing extrudates is made of AA6061, AA6063 or like Al-Mg-Si alloy in view of extrudability and mechanical strength. However, such a material contains Mg, etc. diffused through the surface oxide film, so that the film is less compact than the oxide film of Al only to be formed on a material of pure aluminum. It would then appear preferable to use pure aluminum for preparing extrudates, but the use of pure aluminum which has lower strength than Al-Mg-Si alloys entails the necessity of giving an excessively increased wall thickness to the extrudate to assure the strength required of the product.

Further when a billet of Al-Mg-Si alloy, such as AA6063 or AA6061, is used for preparing a hollow extrudate for a particle accelerating beam chamber, the following problem arises owing to the fact that the alloy fails to exhibit sufficiently reduced electrical resistance at extremely low temperatures such as the temperature of liquid helium. Presently, the beam traveled in the chamber has energy of about $30 \times 30$ GeV, and the current flowing along the inner wall surface of the chamber is not very great, so that the beam is unlikely to become unstable even if the electric resistance of the alloy is not sufficiently low at very low temperatures. Nevertheless, it is attempted to use a beam for travel in the chamber with increased energy of about $20000 \times 20000$ GeV. If the beam energy is increased to such a level, the wall current also increases, with the result that the use of AA6063 or AA6061 alloy renders the beam unstable because the electrical resistance of the alloy is not sufficiently low at extremely low temperatures.

SUMMARY OF THE INVENTION

The main object of the present invention is to solve the foregoing problems and to provide a process for producing for use in a vacuum a hollow extrudate which is satisfactory in mechanical strength, low in electrical resistance at extremely low temperatures and easy to maintain at a high vacuum in its interior.

The process of the present invention for producing a hollow extrudate for use in a vacuum comprises the steps of hermetically closing the forward open end of a hollow shaped material immediately after extrusion from a billet, cutting the shaped material after a predetermined length thereof has been subsequently extruded and hermetically closing the cut end at the same time, and cutting off the closed ends, the process being characterized in that the billet is a composite material composed of a core of aluminum having a high purity of at least 99.9% and an aluminum alloy cladding to form in the hollow extrudate obtained an inner layer and an outer layer corresponding to the core and the cladding, respectively.

The process of the present invention produces a hollow extrudate which is satisfactory in mechanical strength, low in the electrical resistance of its inner layer at low temperatures and easy to maintain at a high degree of vacuum in its interior. Accordingly, the hollow extrudate obtained by the present process is suited for use in a high vacuum, for example, for providing a particle accelerating beam chamber. A beam of high energy can be traveled with good stability within the chamber provided by the extrudate.

BRIEF DESCRIPTION OF THE DRAWINGS

FIG. 2 is a view in longitudinal section showing a hollow extrudate with an intermediate portion thereof omitted, the extrudate being hermetically closed at its opposite ends and having a gas mixture enclosed therein; and FIG. 3 is a view in longitudinal section showing a completed hollow extrudate with an intermediate portion thereof omitted.

DESCRIPTION OF THE PREFERRED EMBODIMENT

Figure 1:
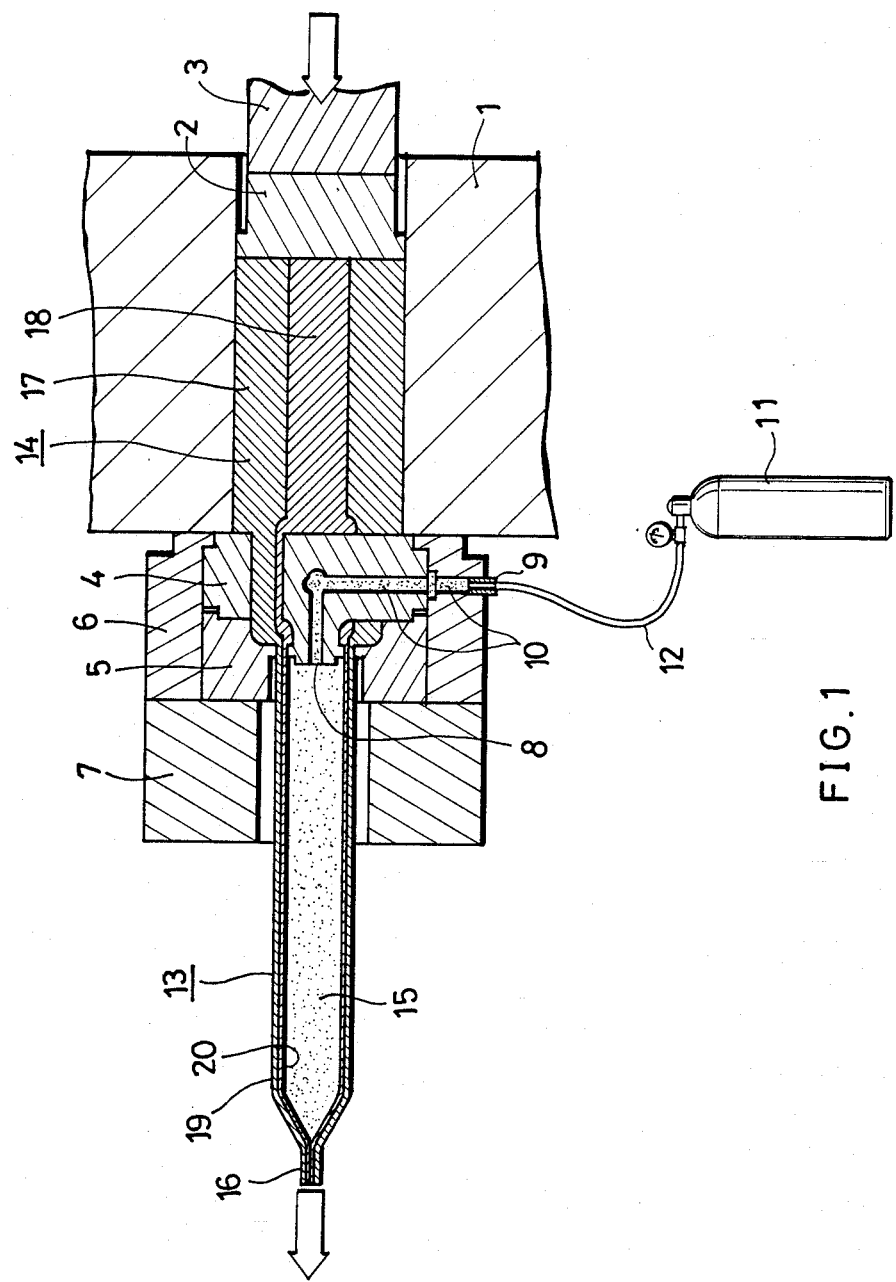
FIG. 1 is a view in longitudinal section showing a hollow extrudate while it is being produced.

The billet to be used for extrusion by the present process is a composite material which is composed of an aluminum core having a high purity of at least 9.9% and an aluminum alloy cladding, for the following reason. The hollow extrudate prepared from the composite billet has an inner layer of high-purity aluminum. When the extrudate is used for a particle accelerating beam chamber as cooled with liquid helium or the like for the travel of a beam, the electrical resistance of the inner layer greatly decreases, permitting stable travel of the beam even if the beam has high energy (about $20000 \times 20000$ GeV) and if the wall current is great. It is especially desirable to use a billet with a core of aluminum having a high purity of at least 99.99%. The amount of the core is such that the inner layer of the hollow extrudate obtained is at least 10 μm in thickness.

In view of mechanical strength, extrudability, etc., the cladding to be used is made of one of aluminum alloys of AA2000s, AA3000s, AA5000s, AA6000s, etc. Among such alloys, it is desirable to use aluminum alloys of AA6000s.

The composite billet is obtained by centrally boring a billet of aluminum alloy and inserting into the bore a round bar of high-purity aluminum separately prepared, or by enclosing a billet of high purity aluminum with an aluminum alloy by casting.

The hollow extrudate obtained has an inner layer and an outer layer corresponding to the core and the cladding, respectively, of the billet. The extrudate of this structure can be obtained by the extrusion process disclosed in U.S. Pat. No. 4,578,973.

After the forward open end of the shaped material has been hermetically closed, it is more desirable to evacuate the hollow portion of the shaped material concurrently with extrusion than to merely continue the extruding operation as disclose in U.S. Pat. No. 4,578,973. Instead of the evacuation, an inert gas alone or a mixture of oxygen and inert gas may be supplied to the hollow portion from the start of extrusion of the shaped material. In the latter case, it is suitable that the mixture comprise 0.5 to 30 vol. %, preferably 1 to 10 vol. %, of oxygen and the balance an inert gas. Argon or helium is usually used as the inert gas. The closed opposite ends may be cut off before or after the hollow extrudate shaped is sent to the site of use.

The process of the present invention will now be described with reference to the drawings.

FIG. 1 shows an extruder which includes a known container 1, dummy block 2, stem 3, porthole male die 4, porthole female die 5, die holder 6 and bolster 7. The male die 4 is centrally formed with a gas injection outlet 8. A gas channel 10 extending from a gas inlet 9 in the lower end of the die holder 6 to the outlet 8 is formed in the male die 4 and the die holder 6. The free end of a conduit 12 attached to a gas container 11 is connected to the gas inlet 9.

The extruder produces a hollow extrudate 30 in the form of a pipe as shown in FIG. 3 for providing a particle accelerating beam chamber. The dies to be used for producing the extrudate 30 are of course shaped in conformity with the shape of the extrudate 30. The peripheral wall of the extrudate 30 has a double-layer structure comprising an inner layer 20 and an outer layer 19. Extrudates 30 of predetermined length are connected to one another into an endless pipe providing a particle accelerating beam chamber.

The hollow extrudate 30 is produced by the following steps. First, the dies are cleaned with a caustic agent, and a composite billet 14 is thereafter extruded without using any lubricant. The composite billet 14 comprises an aluminum core 18 having a high purity of at least 99.9% and an aluminum alloy cladding 17. Simultaneously with the extrusion, a gas mixture 15 of oxygen and inert gas is injected into the hollow portion of the shaped material 13 being extruded, from the container 11 via the conduit 12, the channel 10 and the outlet 8. After a short length of material 13 has been extruded, the forward open end thereof is hermetically closed by a press to form a closed end 16 as shown in FIG. 1. The shaped material 13 is formed with an inner layer 20 and an outer layer 19 corresponding to the core 18 and the cladding 17, respectively. After a predetermined length has been extruded with continued supply of the gas mixture 15, the shaped material 13 is cut by a shear, and at the same time, the cut end of the length is hermetically closed to form the other closed end 21 (see. FIG. 2). The shaped material 13 is thereafter forcedly cooled in air with the gas mixture 15 enclosed therein, then spontaneously cooled and subsequently tensioned for correction. Finally the closed ends 16 and 21 of the shaped material 13 are cut off without using any oil and air blow to obtain a hollow extrudate 30 of predetermined size (see FIG. 3). The extrudate 30 has a compact and thin oxide film formed on its inner surface.

EXAMPLE 1

The composite billet 14 used was composed of an aluminum core 18 having a high purity of 99.9% and a cladding 17 of AA6063 alloy. After the dies were cleaned with a caustic agent, the billet 14 homogenized at 560° C. for 3 hours was extruded at a temperature of 500° C. at a speed of 10 m/min without using any lubricant. Simultaneously with the extrusion, a gas mixture 15 of 7 vol. % of oxygen and argon, the balance, was injected at a pressure of 2 to 3 kg/cm$^2$ into the hollow portion of the shaped material 13 being extruded, from the container 11 by way of the conduit 12, the channel 10 and the outlet 8. After a short length of material 13 was extruded, the forward open end thereof was hermetically closed by a press to form a closed end 16. The shaped material 13 was formed with an inner layer 20 and an outer layer 19 corresponding to the core 18 and the cladding 17, respectively. After a predetermined length was extruded with continued supply of the gas mixture 15, the shaped material 13 was cut by a shear, and at the same time, the cut end was hermetically closed to form the other closed end 21. The shaped material 13 was thereafter forcedly cooled in air to 250° C. with the gas mixture 15 enclosed therein, then spontaneously cooled and subsequently tensioned for correction. Next, the material was aged at 180° C. for 6 hours. Finally, the closed ends 16 and 21 of the shaped material 13 were cut off without using any oil and air blow to obtain a hollow extrudate 30 of specified size. To check the performance of the hollow extrudate 30, the gas release ratio of the inner surface and the residual resistance ratio of the inner layer 20 were determined.

The gas release ratio was measured after subjecting the inner peripheral surface of the extrudate to an outgassing treatment by heating at 150° C. for 24 hours. The residual resistance ratio was determined by measuring the electrical resistance A at room temperature and the electrical resistance B at the temperature of liquid helium and calculating the ratio of the former A to the latter B (A/B). The results are listed in the table below.

EXAMPLE 2

A hollow extrudate 30 was prepared in the same manner as in Example 1 except that the composite billet 14 used was composed of an aluminum core 18 having a high purity of 99.99% and a cladding 17 of AA6063 alloy. The gas release ratio of the inner surface of the extrudate and the residual resistance ratio of the inner layer thereof were determined in the same manner as in Example 1. The results are listed in the table below.

COMPARATIVE EXAMPLE 1

A hollow extrudate was prepared in the same manner as in Example 1 except that the composite billet 14 used was composed of an aluminum core 18 having a purity of 99.5% and a cladding 17 of AA6063 alloy. The gas release ratio of the inner surface of the extrudate and the residual resistance ratio of the inner layer thereof were determined in the same manner as in Example 1. The results are listed in the table below.

COMPARATIVE EXAMPLE 2

A hollow extrudate was prepared in the same manner as in Example 1 except that a billet of AA6063 alloy was used in place of the composite billet 14. The as release ratio of the inner surface of the extrudate and the residual resistance ratio of the entire extrudate were determined in the same manner as in Example 1. The results are listed below.

|  | Gas release ratio (torr.l/s.cm$^2$) | Residual resistance ratio |
| --- | --- | --- |
| Example 1 | $5 \times 10^{-14}$ | 100 |
| Example 2 | $2 \times 10^{-14}$ | 1500 |
| Comp. Ex. 1 | $7 \times 10^{-14}$ | 15 |
| Comp. Ex. 2 | $2 \times 10^{-13}$ | 5 |

The above table reveals that the hollow extrudates prepared by the process of the invention are lower than those of the comparative examples in the gas release ratio of the their inner surface and in the low-temperature resistance. This indicates that the present extrudates are improved in vacuum retentivity and exceedingly low in electrical resistance at the temperature of liquid helium.

What is claimed is:

1. A pipe for use under conditions of high vacuum and low temperature comprising a double-layer hollow extrudate having an outer layer of an aluminum alloy and an inner layer of aluminum having a purity of at least 99.9%, the hollow interior and the inner surface of the inner layer of said pipe having been kept out of contact with air during extrusion and the inner layer of the inner surface of the pipe having a low gas release ratio and low electrical resistance under condition of use.

2. A pipe as defined in claim 1, wherein said inner layer is at least 10 μm in thickness.

3. A pipe as defined in claim 1, wherein said inner layer has a thin oxide coating on its inner surface.

4. A pipe as defined in claim 1, wherein the outer layer is made of an aluminum alloy selected from the group consisting of AA2000, AA3000, AA5000 and AA6000 aluminum alloys.

5. A pipe as defined in claim 4, wherein the aluminum alloy is a AA6000 alloy.

* * * * *